United States Patent
Shiozaki et al.

(10) Patent No.: US 11,824,202 B2
(45) Date of Patent: Nov. 21, 2023

(54) SECONDARY BATTERY INCLUDING INSULATING TAPE COVERING POSITIVE ELECTRODE

(71) Applicant: Panasonic Intellectual Property Management Co., Ltd., Osaka (JP)

(72) Inventors: Tomoki Shiozaki, Osaka (JP); Yuji Oura, Osaka (JP); Hajime Nishino, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/404,090

(22) Filed: Aug. 17, 2021

(65) Prior Publication Data

US 2021/0376333 A1  Dec. 2, 2021

Related U.S. Application Data

(63) Continuation of application No. 15/886,417, filed on Feb. 1, 2018, now Pat. No. 11,139,480, which is a
(Continued)

(30) Foreign Application Priority Data

Aug. 31, 2015 (JP) ................. 2015-170347

(51) Int. Cl.
*H01M 4/66* (2006.01)
*H01M 50/533* (2021.01)
(Continued)

(52) U.S. Cl.
CPC ............ *H01M 4/661* (2013.01); *H01M 4/13* (2013.01); *H01M 4/40* (2013.01); *H01M 4/463* (2013.01);
(Continued)

(58) Field of Classification Search
CPC .......... H01M 4/661; H01M 4/13; H01M 4/40; H01M 4/463; H01M 50/531; H01M 50/572; H01M 10/0525
See application file for complete search history.

(56) References Cited

U.S. PATENT DOCUMENTS

| | | |
|---|---|---|
| 6,123,799 A | 9/2000 | Ohura et al. |
| 2004/0081890 A1 | 4/2004 | Xing et al. |

(Continued)

FOREIGN PATENT DOCUMENTS

| | | |
|---|---|---|
| CN | 102110845 A | 6/2011 |
| CN | 103013366 A | 4/2013 |

(Continued)

OTHER PUBLICATIONS

Nakamura, "Lithium Secondary Battery", May 9, 2003 (Year: 2003).*

(Continued)

*Primary Examiner* — Jimmy Vo
(74) *Attorney, Agent, or Firm* — WHDA, LLP

(57) ABSTRACT

A secondary battery includes: a positive electrode having a positive-electrode current collector and a positive-electrode active-material layer; a negative electrode having a negative-electrode current collector and a negative-electrode active-material layer; a electrolyte; and an insulating tape covering a portion of the positive electrode. Furthermore, the positive-electrode current collector has an exposed section that the positive-electrode active-material layer is not disposed. In addition, at least a portion of the exposed section is covered with the insulating tape; the insulating tape has a substrate material layer and an adhesive layer; and the adhesive layer includes an adhesive agent and an insulating inorganic material.

19 Claims, 3 Drawing Sheets

Related U.S. Application Data continuation of application No. PCT/JP2016/003602, filed on Aug. 4, 2016.

(51) Int. Cl.
| | |
|---|---|
| *H01M 50/586* | (2021.01) |
| *H01M 50/534* | (2021.01) |
| *H01M 50/595* | (2021.01) |
| *H01M 4/13* | (2010.01) |
| *H01M 4/40* | (2006.01) |
| *H01M 4/46* | (2006.01) |
| *H01M 10/0525* | (2010.01) |
| *H01M 4/02* | (2006.01) |

(52) U.S. Cl.
CPC ..... *H01M 10/0525* (2013.01); *H01M 50/533* (2021.01); *H01M 50/534* (2021.01); *H01M 50/586* (2021.01); *H01M 50/595* (2021.01); *H01M 2004/025* (2013.01); *H01M 2004/028* (2013.01)

(56) References Cited

U.S. PATENT DOCUMENTS

| | | |
|---|---|---|
| 2010/0221585 A1 | 9/2010 | Terashima et al. |
| 2011/0159344 A1 | 6/2011 | Kobayashi et al. |
| 2012/0107573 A1 | 5/2012 | Iwata et al. |
| 2012/0196172 A1 | 8/2012 | Maeda et al. |
| 2012/0244423 A1 | 9/2012 | Kusukawa et al. |
| 2013/0071740 A1 | 3/2013 | Takamura et al. |
| 2014/0011060 A1 | 1/2014 | Yang et al. |
| 2014/0120417 A1 | 5/2014 | Matsushita et al. |
| 2014/0242450 A1 | 8/2014 | Oono et al. |
| 2015/0147624 A1* | 5/2015 | Yamafuku .......... H01M 50/505 29/623.5 |

FOREIGN PATENT DOCUMENTS

| | | | |
|---|---|---|---|
| CN | 104659368 A | | 5/2015 |
| CN | 105914306 A | * 8/2016 | ............ B32B 15/08 |
| JP | 11-292998 A | | 10/1999 |
| JP | 2003-132875 A | | 5/2003 |
| JP | 2006-111644 A | | 4/2006 |
| JP | 2009-013361 A | | 1/2009 |
| JP | 2009-260332 A | | 11/2009 |
| JP | 2010-184979 A | | 8/2010 |
| JP | 2010-205467 A | | 9/2010 |
| JP | 2011-138632 A | | 7/2011 |
| JP | 2012-99227 A | | 5/2012 |
| JP | 2012-199162 A | | 10/2012 |
| JP | 2014-89856 A | | 5/2014 |
| WO | 98/24860 A1 | | 6/1998 |
| WO | 03/093336 A1 | | 11/2003 |
| WO | 2013/069704 A1 | | 5/2013 |
| WO | 2014/050369 A1 | | 4/2014 |

OTHER PUBLICATIONS

International Search Report dated Nov. 1, 2016, issued in counterpart International Application No. PCT/JP2016/003602 (2 pages).
English Translation of Search Report dated Jan. 3, 2020, issued in counterpart CN Application No. 201680042693.8. (3 pages).

* cited by examiner

SECONDARY BATTERY INCLUDING INSULATING TAPE COVERING POSITIVE ELECTRODE

CROSS REFERENCE TO RELATED APPLICATIONS

This application is a Continuation of U.S. patent application Ser. No. 15/886,417, filed Feb. 1, 2018, which is a Bypass Continuation of International Application No. PCT/JP2016/003602 filed Aug. 4, 2016, which claims the benefit of Japanese Patent Application No. 2015-170347 filed in the Japan Patent Office on Aug. 31, 2015, each of which is incorporated by reference herein in its entirety.

TECHNICAL FIELD

The present invention relates to a secondary battery and particularly relates to a secondary battery having a high energy density.

BACKGROUND ART

In recent years, an increase in energy density of a nonaqueous electrolyte secondary battery has been advanced, and the mass of power generation elements to be filled in a battery case having a limited volume has been continuously increased. Hence, in order to sufficiently secure the safety, requirements for the battery have been increasingly severe. For example, in consideration of the case in which an internal short circuit occurs, it is important to suppress heat generation by designing the battery so that a short-circuited portion is not likely to be expanded.

A short-circuit current is frequently generated from an exposed section of a current collector which functions as a starting point. In particular, when an exposed section of a positive-electrode current collector is in contact with a negative-electrode active-material layer having a high electric conductivity, a short-circuit current is liable to flow. In this case, since the short-circuit current causes heat generation, the damage of a positive electrode active material may be promoted in some cases.

In consideration of the case described above, for example, according to Patent Literature 1, the exposed section of the positive-electrode current collector is covered with an insulating protective tape.

CITATION LIST

Patent Literature

Patent Literature 1: Japanese Published Unexamined Patent Application No. 2014-89856

SUMMARY OF INVENTION

Technical Problem

As an insulating tape covering an exposed section of a positive-electrode current collector, in general, a tape having a polypropylene-made substrate material layer which has a resistance against a nonaqueous electrolyte and which is inexpensive and an adhesive layer which contains an acrylic resin or a butyl rubber as an adhesive agent is used.

However, in consideration of recent rapid improvement in energy density of the battery, it has been desired that even if a foreign material having an unexpectedly large size is mixed in, the heat generation is sufficiently suppressed. In order to suppress the heat generation, it is important to prevent an increase in short-circuit current. However, in the case of a latest battery having an increased energy density, when a positive-electrode current collector and a negative-electrode active-material layer are in contact with each other, the temperature of a short-circuited portion may be instantly increased to 500° C. or more in some cases. In this case, by a related insulating tape, the increase in short-circuit current is difficult to prevent.

Solution to Problem

In consideration of those described above, in order to secure sufficient safety, it has been desired that with an insulating tape capable of securing a sufficient insulating property at at least 500° C., the exposed section of the positive-electrode current collector is covered.

Accordingly, a secondary battery according to the present disclosure comprises: a positive electrode having a positive-electrode current collector and a positive-electrode active-material layer disposed on the positive-electrode current collector; a negative electrode having a negative-electrode current collector and a negative-electrode active-material layer disposed on the negative-electrode current collector; a electrolyte; and an insulating tape covering a portion of the positive electrode. In a secondary battery, the positive-electrode current collector has an exposed section not supporting the positive-electrode active-material layer thereon, the positive-electrode lead is connected to the exposed section, the positive-electrode lead has an extended portion projected from the exposed section and an overlapping section overlapping the exposed section, and at least a portion of the exposed section, together with at least a portion of the overlapping section, is covered with the insulating tape, the insulating tape has a substrate material layer and an adhesive layer, and the adhesive layer includes an adhesive agent and an insulating inorganic material.

Advantageous Effects of Invention

According to the present disclosure, even in the case in which an unexpectedly large foreign material is mixed in a secondary battery having a high energy density, and the foreign material penetrates an insulating tape to generate an internal short circuit, the heat generation can be suppressed.

DESCRIPTION OF EMBODIMENTS

Figure 1:
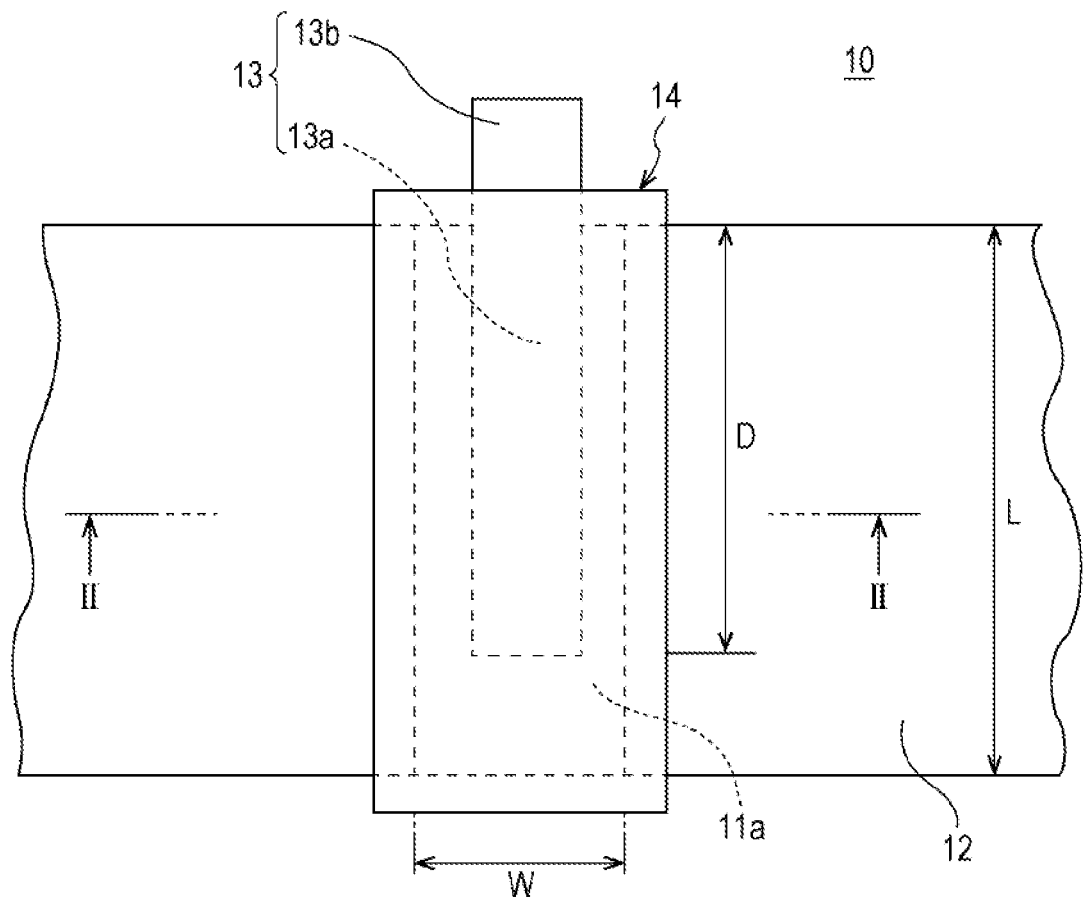
FIG. 1 is a plan view of an important portion of a positive electrode according to one embodiment of the present invention.

A secondary battery according to an embodiment of the present invention comprises: a positive electrode having a positive-electrode current collector and a positive-electrode active-material layer disposed on the positive-electrode current collector; a negative electrode having a negative-electrode current collector and a negative-electrode active-material layer disposed on the negative-electrode current collector; a separator interposed between the positive electrode and the negative electrode; a electrolyte; a positive-electrode lead electrically connected to the positive electrode; and an insulating tape covering a portion of the positive electrode. The positive electrode and the negative electrode each may be either a belt-shaped electrode or a flat plate electrode. The battery may be either a winding type or a lamination type.

The positive-electrode current collector has an exposed section that the positive-electrode active-material layer is not disposed, and the positive-electrode lead is connected to the exposed section. The exposed section may be formed at any region of the positive-electrode current collector.

The positive-electrode lead has an extended section projected from the exposed section and an overlapping section overlapping the exposed section. The extended section is connected to a positive-electrode terminal or to a component of the battery which is electrically connected to the positive-electrode terminal. At least a portion of the overlapping section is welded to the exposed section or is bonded to the exposed section by an electric-conductive bonding material.

The insulating tape covers at least a portion of the exposed section of the positive-electrode current collector together with at least a portion of the overlapping section of the positive-electrode lead. The insulating tape has a substrate material layer and an adhesive layer. Accordingly, a short circuit between the exposed section of the positive-electrode current collector and the negative-electrode active-material layer can be suppressed. However, in order to secure sufficient safety of the battery, the case in which an unexpectedly large foreign material is mixed in and penetrates the insulating tape is also required to be considered in advance.

In consideration of the point described above, when the adhesive layer of the insulating tape includes both an adhesive agent and an insulating inorganic material, even if a large foreign material penetrates the insulating tape, an expansion of a short-circuited portion is suppressed. Accordingly, an increase in short-circuit current is prevented, and hence, the heat generation can be suppressed. In addition, the adhesive layer of the insulating tape preferably has an electric resistance of 1 k$\Omega$/mm$^2$ or more at 500° C. and more preferably has an electric resistance of 8 k$\Omega$/mm$^2$ or more, and in order to enhance the effect of preventing the expansion of the short-circuited portion and the increase in short-circuit current, it is more preferable that the adhesive layer is able to maintain an electric resistance of 1 k$\Omega$/mm$^2$ or more at 600° C. and furthermore even at 700° C.

If the adhesive layer includes no insulating inorganic material, when a large foreign material penetrates the insulating tape, and the temperature of the short-circuited portion is instantly increased (such as to 500° C. or more), the adhesive agent may be thermally decomposed in some cases. Since the adhesive agent generally contains an organic material, such as an acrylic resin or a synthetic rubber, carbides are generated by the thermal decomposition, and a new electric-conductive path may be formed in some cases. Hence, it is difficult to maintain a predetermined electric resistance or more (such as 1 k$\Omega$/mm$^2$ or more). On the other hand, when the adhesive layer includes an insulating inorganic material, even if carbides are generated, since the resistance thereof is high, an electric-conductive path is not likely to be formed. Hence, for example, even when heating is performed to 500° C., an electric resistance of 1 k$\Omega$/mm$^2$ or more can be maintained. In this case, even when the temperature of the short-circuited portion is temporarily increased to 500° C. or more, the expansion of the short-circuited portion and the increase in short-circuit current are suppressed. Accordingly, the heat generation is also suppressed, and before abnormal heat generation occurs, the short-circuit current can be converged.

In addition, when a material, such as a polyimide, having a high heat resistance is used for the substrate material layer, and in addition, when the thickness of the substrate material layer is increased to 50 μm or more, it is believed that for example, even at a temperature of 500° C. or more, an electric resistance of 1 k$\Omega$/mm$^2$ or more can be maintained for at least a predetermined period. However, the increase in thickness of the substrate material layer functions as a barrier when a battery having a high energy density is designed. Hence, by the substrate material layer itself, it is difficult to overcome an internal short circuit caused by a large size foreign material to be mixed in.

The structure of the adhesive layer is not particularly limited as long as including an adhesive agent and an insulating inorganic material. However, in the case of a battery having a high energy density, in a battery case having a limited volume, many power generation elements are filled as much as possible. Hence, it is desired that the thickness of the insulating tape is decreased as much as possible. In consideration of those described above, in order to maintain an electric resistance of 1 k$\Omega$/mm$^2$ or more at 500° C. even though the thickness of the insulating tape is small, a sufficient amount of the insulating inorganic material is preferably included in the adhesive layer. In addition, it is preferable that the adhesive agent and the insulating inorganic material are, for example, sufficiently mixed together and hybridized with each other.

In order to increase the energy density of the battery, the thickness of the insulating tape is preferably 45 μm or less and more preferably 35 μm or less. However, when the insulating tape is excessively thin, the strength and the insulating property thereof may become insufficient in some cases. In order to secure sufficient strength and insulating property of the insulating tape, the thickness of the insulating tape is preferably set to 15 μm or more and more preferably set to 25 μm or more.

In consideration of obtaining a sufficient electric resistance together with the adhesive property, a thickness $T_{ad}$ of the adhesive layer is preferably, for example, 5 to 25 μm. Since the thickness $T_{ad}$ of the adhesive layer is set to 5 μm or more, the electric resistance of the adhesive layer can be easily maintained at 1 k$\Omega$/mm$^2$ or more even at a high temperature of 500° C. or more. In addition, since the thickness $T_{ad}$ of the adhesive layer is set to 25 μm or less, the total thickness of the insulating tape can be decreased, so that the increase in energy density of the battery can be advantageously performed.

In this embodiment, when an electric resistance of 1 k$\Omega$/mm$^2$ or more can be maintained at 500° C. for 1 minute or more, the adhesive layer is regarded to be sufficient. The electric resistance of the adhesive layer at 500° C. can be measured by the following method. First, while an adhesive layer cut to have an area of 1 cm$^2$ is sandwiched between two platinum-made flat plate electrodes and is maintained at 500° C., the electric resistant is measured. In this case, after the temperature of the sample of the adhesive layer is increased to 500° C., when an electric resistance of 1 k$\Omega$/mm$^2$ or more can be maintained for 1 minute, the adhesive layer can be regarded to have an electric resistance of 1 k$\Omega$/mm$^2$ or more at 500° C.

A thickness $T_{sb}$ of the substrate material layer is preferably, for example, 10 to 30 µm. Since the thickness $T_{sb}$ of the substrate material layer is set to 10 µm or more, the electric resistance of the insulating tape can be easily maintained even at a high temperature of 500° C. or more, and in addition, the strength is secured; hence, even when a large-size foreign material is mixed in, the insulating tape is not likely to be damaged. In addition, when the thickness $T_{sb}$ of the substrate material layer is 30 µm or less, while a high strength is maintained, an insulating tape having a small thickness can be easily designed.

A ratio: $T_{ad}/T_{sb}$ of the thickness $T_{ad}$ of the adhesive layer to the thickness $T_{sb}$ of the substrate material layer is preferably 0.2 to 1. Accordingly, while the increase in thickness of the insulating tape is suppressed, a high strength and a high electric resistance at a high temperature can both be easily obtained.

In this embodiment, as a secondary battery having a high energy density, for example, a battery having a volume energy density of 400 Wh/L or more and in particular a volume energy density of 600 Wh/L or more may be mentioned. The volume energy density is a characteristic value obtained by dividing the product of a nominal voltage and a nominal capacity of the battery by the volume thereof.

Hereinafter, a lithium ion secondary battery according to one embodiment of the present invention will be described in more detail with reference to the drawings.

(Positive Electrode)

A positive electrode has a positive-electrode current collector and a positive-electrode active-material layer disposed on the positive-electrode current collector. However, for the positive-electrode current collector, an exposed section that the positive-electrode active-material layer is not disposed is provided. The exposed section may be either two-sided exposed sections of the two surfaces of the positive-electrode current collector each that the positive-electrode active-material layer is not disposed or a one-sided exposed section of one surface of the positive-electrode current collector that the positive-electrode active-material layer is not disposed (that is, the other side surface that the positive-electrode active-material layer is disposed). Although the shape of the exposed section is not particularly limited, in the case of a belt-shaped electrode, a slit shape having a narrow width intersecting the positive-electrode current collector at an angle of 80° to 100° with respect to a length direction thereof is preferable. The width of the slit-shaped exposed section is preferably 3 to 20 mm in order to suppress a reduction in energy density.

As the positive-electrode current collector, a sheet-shaped electric-conductive material is used, and in particular, metal foil is preferable. As a metal forming the metal foil, for example, aluminum, an aluminum alloy, stainless steel, titanium, or a titanium alloy is preferable. The thickness of the positive-electrode current collector is, for example, 1 to 100 µm and preferably 10 to 50 µm.

The positive-electrode active-material layer of the lithium ion secondary battery includes a positive electrode active material, an electric-conductive agent, a binding material, and the like. The positive electrode active material is a material capable of being doped or dedoped with lithium ions, and for example, a lithium composite oxide is preferably used. The lithium composite oxide contains a transition metal in which the valence thereof is changed by oxidation and reduction. As the transition metal, for example, vanadium, manganese, iron, cobalt, nickel, or titanium may be mentioned. In more particular, for example, $LiCoO_2$, $LiMn_2O_4$, $LiNiO_2$, $LiNi_{x1}Mn_{y1}Co_{1-(x1+y1)}O_2$, $LiNi_{x2}Co_{y2}M_{1-(x2+y2)}O_2$, $\alpha LiFeO_2$, or $LiVO_2$ may be mentioned. In this case, x1 and y1 satisfy $0.25 \leq x1 \leq 0.5$ and $0.25 \leq y1 \leq 0.5$, respectively; x2 and y2 satisfy $0.75 \leq x2 \leq 0.99$ and $0.01 \leq y2 \leq 0.25$, respectively; and M is at least one element selected from the group consisting of Na, Mg, Sc, Y, Ti, V, Cr, Fe, Cu, Ag, Zn, Al, Ga, In, Sn, Pb, and Sb.

As the electric-conductive agent included in the positive-electrode active-material layer, for example, carbon black, graphite, and carbon fibers may be used. The amount of the electric-conductive agent with respect to 100 parts by mass of the positive electrode active material is, for example, 0 to 20 parts by mass. As the binding agent included in the active-material layer, for example, a fluorine resin, an acrylic resin, or rubber particles may be used. The amount of the binding agent with respect to 100 parts by mass of the active material is, for example, 0.5 to 15 parts by mass.

The positive-electrode active-material layer is formed in such a way that after a positive-electrode mixture including the positive electrode active material, the binding agent, the electric-conductive agent, and the like is kneaded with a dispersant to prepare a positive-electrode paste, the positive-electrode paste is applied to a predetermined region of the surface of the positive-electrode current collector, followed by drying and rolling. As the dispersant, for example, an organic solvent or water may be used. As the organic solvent, for example, although N-methyl-2-pyrrolydone (NMP) is preferably used, the organic solvent is not particularly limited. The application of the positive-electrode paste may be performed using various coaters. The drying after the application may be performed either by spontaneous drying or by heating. The thickness of the positive-electrode active-material layer is, for example, 70 to 250 µm and preferably 100 to 200 µm.

For the positive-electrode current collector, the exposed section that the positive-electrode active-material layer is not disposed is provided. In the case of a belt-shaped positive electrode, when the positive-electrode paste is intermittently applied to the positive-electrode current collector, the exposed section can be formed at an end portion of the positive electrode in a length direction thereof or at a region other than the end portion (such as a position apart from each of the two end portions of the positive electrode by 20% or more of the length thereof). In this case, the exposed section is preferably a slit-shaped exposed section in which the belt-shaped positive-electrode current collector is exposed from one end portion to the other end portion thereof in a width direction. In addition, the exposed section may be formed by peeling a part of the positive-electrode active-material layer from the positive electrode.

To the exposed section, for example, a strip-shaped (strip) positive-electrode lead is electrically connected. For example, at least a part of a section (overlapping section) at which the positive-electrode lead overlaps the exposed section is bonded to the exposed section by welding. Subsequently, at least a portion of the exposed section of the positive-electrode current collector (preferably 90% or more of the area of the exposed section) and at least a portion of the overlapping section of the positive-electrode lead (preferably 90% or more of the area of the overlapping section) are both covered with the insulating tape.

As a material of a positive-electrode lead 13, for example, aluminum, an aluminum alloy, nickel, a nickel alloy, iron, or stainless steel may be used. The thickness of the positive-electrode lead 13 is, for example, 10 to 120 µm and preferably 20 to 80 µm. Although the size of the positive-electrode lead 13 is not particularly limited, for example, the shape is a strip having a width of 2 to 8 mm and a length of 20 to 80 mm.

Figure 2:
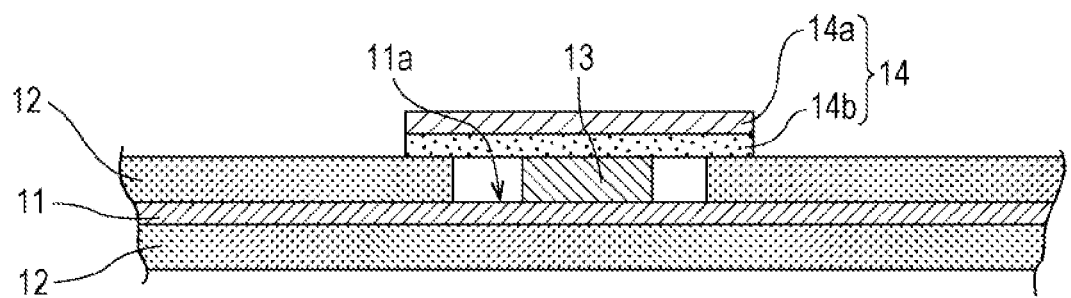
FIG. 2 is a cross-sectional view taken along the line II-II of the important portion of the positive electrode shown in FIG. 1.

FIG. 1 is a plan view showing an important portion of a belt-shaped positive electrode according to one embodiment of the present invention, and FIG. 2 is a cross-sectional view taken along the line II-II of the positive electrode shown in FIG. 1. A belt-shaped positive electrode 10 has positive-electrode active-material layers 12 on two surfaces of a positive-electrode current collector 11 except for some part thereof. Along one surface of the positive-electrode current collector 11, a strip-shaped exposed section 11a in which the positive-electrode current collector 11 is exposed from one end portion to the other end portion thereof in a width direction is provided. Although a width W of the exposed section 11a is determined depending on the size of the battery, in general, the width W is larger than the width of the positive-electrode lead 13, is for example 3 to 20 mm, and is preferably 5 to 16 mm. To the exposed section 11a, an overlapping section 13a of the strip-shaped positive-electrode lead 13 is partially welded. A length D (distance from the boundary between the overlapping section 13a and an extended section 13b to a position of the overlapping section 13a most apart from the boundary) of the overlapping section 13a is dependent on the size of the battery. The length D is, for example, 10 to 60 mm, is 5% to 100% of a width L (length in a short side direction) of the positive-electrode current collector, and is preferably 20% to 95% thereof.

In order to maximally enhance the effect of preventing an internal short circuit, an insulating tape 14 covers the entire surface of the exposed section 11a and also covers the entire surface of the overlapping section 13a of the positive-electrode lead 13. The insulating tape 14 has a substrate material layer 14a and an adhesive layer 14b and is adhered to the exposed section 11a with the adhesive layer 14b interposed therebetween.

In order to reliably cover the exposed section 11a by the insulating tape 14, the insulating tape 14 preferably protrudes from two end portions of the positive electrode 10 in a width direction thereof. A width protruding from each end portion of the positive electrode 10 is preferably set to 0.5 mm or more. In addition, the width protruding from the positive electrode 10 is preferably set to 20 mm or less so that the increase in energy density of the battery is not adversely influenced. By the same reason as described above, the insulating tape 14 protrudes onto the surface of the positive-electrode active-material layer 12 from two end portions of the exposed section 11a in a width direction thereof. A width protruding onto the surface of the positive-electrode active-material layer 12 is set to preferably 0.5 mm or more and preferably 5 mm or less at each end portion.

Next, the insulating tape will be described in more detail.

Figure 3:
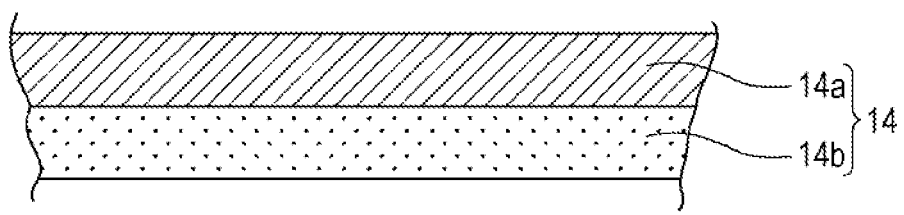
FIG. 3 is a cross-sectional view of an insulating tape according to one embodiment of the present invention.

As shown in FIG. 3, the insulating tape 14 has the substrate material layer 14a and the adhesive layer 14b. The substrate material layer 14a is formed from a resin film or the like and functions to maintain the shape of the insulating tape 14. On the other hand, the adhesive layer 14b functions to adhere the insulating tape 14 to the exposed section of the current collector and the like. The adhesive layer 14b includes an insulating inorganic material and hence, has an electric resistance of 1 k$\Omega$/mm$^2$ or more even at 500° C. The insulating tape may further have another layer for improvement in insulating property and/or heat resistance. For example, between the substrate material layer and the adhesive layer, a layer containing an insulating filler may also be provided.

In order to further decrease the thickness of the insulating tape, for the substrate material layer, a material having a high heat resistance is preferable, and a polyimide, a polyamide, a poly(amide imide), or the like is preferably contained. Among those resins mentioned above, for example, a polyimide or a wholly aromatic polyamide (aramid) is preferable, and in particular, a polyimide is preferable. When containing a polyimide, the substrate material layer may contain a material other than a polyimide and may be formed from a polymer alloy between a polyimide and a resin (second resin) other than a polyimide. In addition, the substrate material layer may have a multilayer structure including a polyimide layer and a second resin layer. However, the content of a polyimide to be contained in the substrate material layer is preferably 80 percent by mass or more and more preferably 90 percent by mass or more.

Although a polyimide is a generic term of a high molecular weight compound including an imide bond as a repeating unit, in general, a polyimide indicates an aromatic polyimide in which aromatic compounds are bonded to each other directly with imide bonds interposed therebetween. Since having a conjugated structure in which imide bonds are each provided between two aromatic rings, the aromatic polyimide is rigid and has a strong molecular structure. The type of polyimide is not particularly limited, and any one of a wholly aromatic polyimide, such as a polypyromellitimide, a semi-aromatic polyimide, such as a poly(ether imide), and a thermosetting polyimide formed by a reaction between bismaleimide and an aromatic diamine may be used. Among those resins mentioned above, a non-thermoplastic polyimide which is not likely to be deformed even at a temperature of 500° C. or more is preferable. Since the substrate material layer contains a polyimide, the shape of the insulating tape can be easily maintained even at a temperature of 500° C. or more. However, although a substrate material layer having a high heat resistance is used, the substrate material layer tends to be degraded when being exposed to a high temperature for a long time.

Accordingly, by including an insulating inorganic material in an adhesive layer, it is important to use an adhesive layer having an electric resistance of 1 k$\Omega$/mm$^2$ or more even at 500° C. In general, when the insulating inorganic material is dispersed in the adhesive layer, the adhesive property of the adhesive layer is degraded. Hence, it is believed that, in general, an insulating inorganic material is not preferably included in the adhesive layer of the insulating tape. On the other hand, in the case of a battery in which the energy density is increased, since an electrode group is tightly bounded with a very strong tensile force, even when the adhesive property is degraded, there is no concern about the peeling of the insulating tape. Hence, the content of the insulating inorganic material included in the adhesive layer is preferably 3 to 80 percent by mass and more preferably 5 to 50 percent by mass.

As the insulating inorganic material, although various inorganic materials may be used and are not particularly limited, for example, a metal compound in the form of particles or fibers is preferably used. Among those mentioned above, metal compound particles are easily mixed with the adhesive agent and are easily uniformly dispersed in the adhesive layer. The particle shape is not particularly limited, and for example, a spherical shape, a flake shape, or a whisker shape may be used. In this case, the adhesive layer may be a mixture of the adhesive agent and particles of the metal compound. As the insulating inorganic material, although a material other than the metal compound may also be used, 90 percent by mass or more of the insulating inorganic material is preferably at least one metal compound. The metal compounds may be used alone, or at least two types thereof may be used in combination.

As the metal compound, for example, a metal oxide, a metal nitride, or a metal carbide may be used. Among those mentioned above, since having a high insulating property and being inexpensive, a metal oxide is preferable. As a particular example of the metal oxide, for example, there may be mentioned alumina, titania, silica, zirconia, or magnesia.

When the particles of the metal compound are used, the average particle diameter thereof may be appropriately designed in accordance with the thickness of the adhesive layer. The average particle diameter (median diameter in volume-basis particle distribution) of the metal compound is, for example, preferably 2 μm or less and more preferably 1 μm or less. In addition, in consideration of the dispersibility in the adhesive layer, the average particle diameter of the metal compound is, for example, preferably 50 nm or more.

Next, for the adhesive agent, although various resin materials may be used and are not particularly limited, for example, there may be used an acrylic resin, a natural rubber, a synthetic rubber, a silicone, an epoxy resin, a melamine resin, or a phenol resin. Those materials may be used alone, or at least two types thereof may be used in combination. The adhesive agent may contain, if needed, besides the above resin material, at least one additive, such as a tackifier, a cross-linking agent, an anti-aging agent, a coloring agent, an antioxidant, a chain transfer agent, a plasticizer, a softening agent, a surfactant, or an antistatic agent, and/or a small amount of a solvent.

The thickness of the insulating tape is preferably controlled to 45 μm or less so as not to disturb the increase in energy density of the battery. Hence, by controlling the ratio in thickness between the substrate material layer and the adhesive layer within a limited thickness range, the advantages of the two layers are preferably maximized. From the point described above, it is preferable that the thickness $T_{ad}$ of the adhesive layer is controlled to 5 to 25 μm and further to 5 to 20 μm, and that the thickness $T_{sb}$ of the substrate material layer is controlled to 10 to 30 μm and further to 15 to 25 μm. In addition, the ratio: $T_{ad}/T_{sb}$ of the thickness $T_{ad}$ of the adhesive layer to the thickness $T_{sb}$ of the substrate material layer is preferably controlled to 0.2 to 1 and further to 0.2 to 0.8.

(Negative Electrode)

A negative electrode has a negative-electrode current collector and a negative-electrode active-material layer disposed on the negative-electrode current collector. In general, for the negative-electrode current collector, an exposed section having no negative-electrode active-material layer thereon is also provided. To the exposed section, for example, a strip-shaped negative-electrode lead may be connected.

As the negative-electrode current collector, a sheet-shaped electric-conductive material is used, and in particular, metal foil is preferable. As a metal forming the metal foil, for example, copper, a copper alloy, nickel, a nickel alloy, or stainless steel is preferable. The thickness of the negative-electrode current collector is, for example, 1 to 100 μm and preferably 2 to 50 μm.

The negative-electrode active-material layer of the lithium ion secondary battery includes a negative electrode active material, a binding agent, and the like. The negative electrode active material is a material capable of being doped and dedoped with lithium ions, and for example, there may be used various graphite, such as natural graphite or man-made graphite, carbon black, mesocarbon microbeads, hard carbon, a transition metal compound capable of being doped or dedoped with lithium ions at a lower potential than that of the positive electrode, silicon, a silicon oxide, a silicon alloy, tin, a tin oxide, or a tin alloy.

As the binding agent included in the negative-electrode active-material layer, for example, there may be used a fluorine resin, an acrylic resin, rubber particles, or a cellulose resin (such as a carboxymethyl cellulose). The amount of the binding agent with respect to 100 parts by mass of the active material is, for example, 0.5 to 15 parts by mass.

The negative-electrode active-material layer is formed in such a way that after a negative-electrode mixture including the negative electrode active material, the binding agent, and the like is kneaded with a dispersant to form a negative-electrode paste, the negative-electrode paste is applied to a predetermined region of the surface of the negative-electrode current collector, followed by drying and rolling. As the dispersant, as is the case of the positive-electrode paste, for example, there may be used an organic solvent or water. The application of the negative-electrode paste may be performed in a manner similar to that of the positive electrode. The thickness of the negative-electrode active-material layer is, for example, 70 to 250 μm and preferably 100 to 200 μm.

(Electrolyte)

The electrolyte is prepared by dissolving a lithium salt in a nonaqueous solvent. As the nonaqueous solvent, for example, there may be mentioned a cyclic carbonate, such as ethylene carbonate or propylene carbonate; a chain carbonate, such as dimethyl carbonate, diethyl carbonate, or ethyl methyl carbonate; a lactone, such as γ-butyrolactone; a chain carboxylic acid ester, such as methyl formate or methyl acetate; a halogenated alkane, such as 1,2-dichloroethane; an alkoxyalkane, such as 1,2-dimethoxyethane; a ketone, such as 4-methyl-2-pentanone; a chain ether, such as pentafluoropropyl methyl ether; a cyclic ether, such as 1,4-dioxane or tetrahydrofuran; a nitrile, such as acetonitrile; an amide, such as N,N-dimethylformamide; a carbamate, such as 3-methyl 2-oxazolidone; a sulfur-containing compound, such as a sulfoxide (such as sulfolane or dimethyl sulfoxide) or 1,3-propanesultone; or a halogen substitute in which a hydrogen atom of the solvent mentioned above is substituted by a halogen atom, such as a fluorine atom. The nonaqueous solvents may be used alone, or at least two types thereof may be in combination.

As the lithium salt, for example, there may be mentioned $LiPF_6$, $LiBF_4$, $LiAsF_6$, $LiSbF_6$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiClO_4$, $LiAlCl_4$, or $Li_2B_{10}Cl_{10}$. The lithium salts may be used alone, or at least two types thereof may be used in combination. The concentration of the lithium salt in the nonaqueous electrolyte is, for example, 0.5 to 1.7 mol/L and preferably 0.7 to 1.5 mol/L.

(Separator)

As the separator, for example, a resin-made microporous film or a non-woven cloth may be used. As a resin forming the separator, for example, there may be mentioned a polyolefin, such as a polyethylene or a polypropylene; a polyamide; a poly(amide imide), or a polyimide. The thickness of the separator is, for example, 5 to 50 μm.

Figure 4:
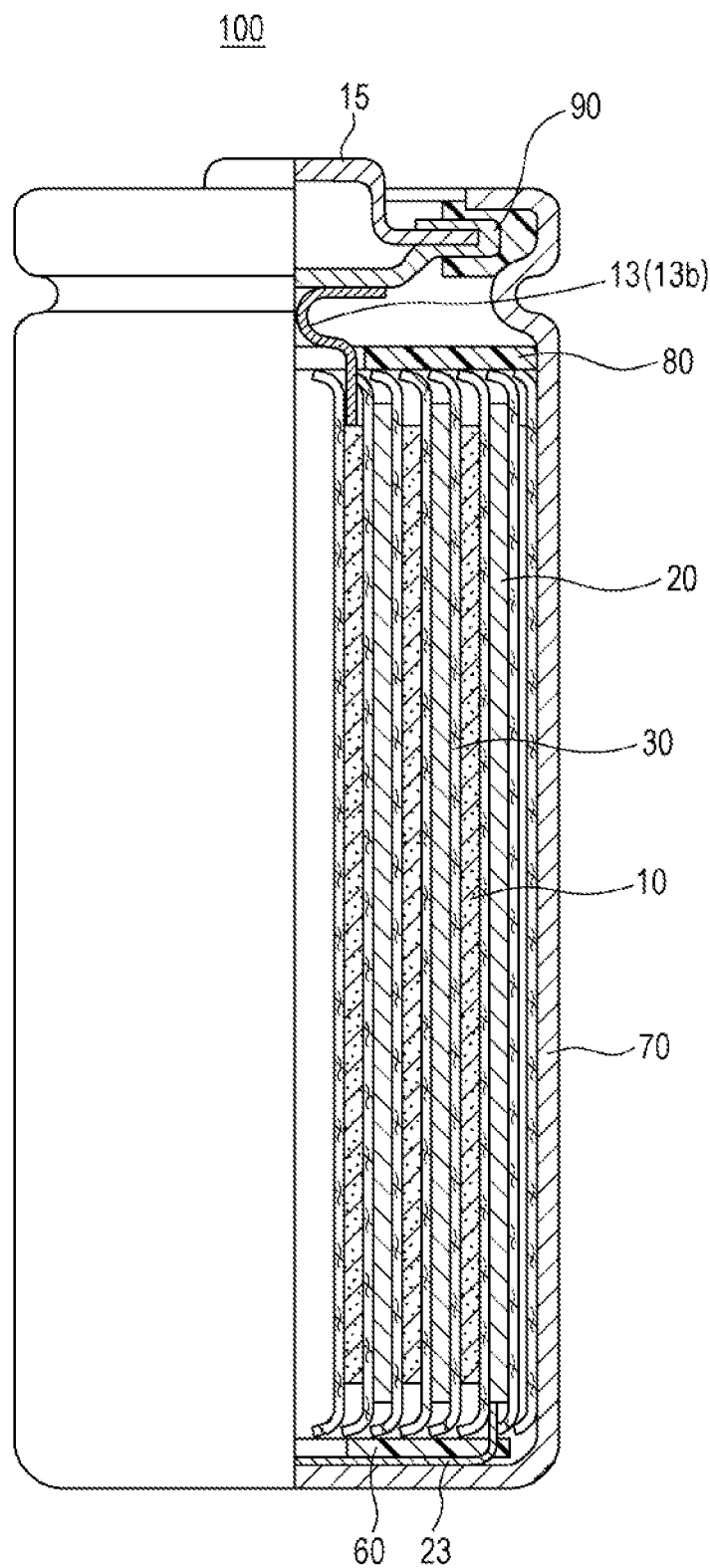
FIG. 4 is a vertical cross-sectional view of a cylindrical type secondary battery according to one embodiment of the present invention.

FIG. 4 is s vertical cross-sectional view of one example of a cylindrical type lithium ion secondary battery according to one embodiment of the present invention.

A lithium ion secondary battery 100 is a winding type battery including a winding type electrode group and a electrolyte not shown in the figure. The electrode group includes a belt-shaped positive electrode 10, a belt-shaped negative electrode 20, and at least one separator 30, a positive-electrode lead 13 is connected to the positive electrode, and a negative-electrode lead 23 is connected to the negative electrode. In addition, the positive-electrode lead 13 is only shown by the extended section 13b, and the overlapping section and the insulating tape are not shown in the figure.

The positive-electrode lead 13 is connected at one end thereof to an exposed section of the positive electrode 10, and the other end is connected to a sealing plate 90. The sealing plate 90 is provided with a positive-electrode terminal 15. The negative-electrode lead 23 is connected at one end thereof to the negative electrode 20, and the other end is connected to a bottom portion of a battery case 70 functioning as a negative-electrode terminal. The battery case 70 is a cylindrical type battery can having a bottom plate, one end thereof in a longitudinal direction is an opening, and a bottom portion at the other end functions as the negative-electrode terminal. The battery case 70 is formed from a metal and is, for example, formed from iron. On the inside surface of the iron-made battery case 70, in general, nickel plating is performed. At the top and the bottom of the electrode group, an upper insulating plate 80 and a lower insulating plate 60, each of which is formed from a resin, are disposed, respectively, so as to sandwich the electrode group.

In addition, the shape of the battery is not particularly limited to a cylindrical type, and for example, either square shape or a flat shape may be used. The battery case may also be formed from a laminate film.

EXAMPLES

Hereinafter, the present invention will be described in more detail with reference to examples. However, the present invention is not limited to the following examples.

Example 1

(1) Formation of Positive Electrode

First, 100 parts by mass of $LiNi_{0.82}Co_{0.15}Al_{0.03}O_2$ functioning as a positive electrode active material, 1.0 part by mass of acetylene black, 0.9 parts by mass of a poly (vinylidene fluoride) (binding agent), and an appropriate amount of NMP were mixed together, so that a positive-electrode paste was prepared. The positive-electrode paste thus obtained was uniformly applied onto two surfaces of aluminum foil having a thickness of 20 μm to be used as a positive-electrode current collector, followed by drying and rolling, so that a belt-shaped positive electrode having a width of 58 mm was formed. However, at an approximately central portion of each of two surfaces of the positive electrode in a longitudinal direction thereof, a slit-shape exposed section was provided from one end portion to the other end portion of the positive-electrode current collector in a width direction thereof. In this case, a width W of the exposed section was set to 6.5 mm.

Next, an aluminum-made slit-shaped positive-electrode lead having a width of 3.5 mm and a length of 68 mm was overlapped on the exposed section of the positive-electrode current collector and was aligned so that the length of an extended section was 15 mm and the length (length D) of an overlapping section was 53 mm, and the overlapping section was welded to the exposed section.

Subsequently, an insulating tape was adhered to the positive electrode so as to cover the entire surface of the exposed section and the entire surface of the overlapping section. In this step, in order to reliably cover the exposed section by the insulating tape, the insulating tape was protruded from each of the two end portions of the positive electrode in a width direction thereof by 2 mm. In addition, from each of the two end portions of the exposed section in a width direction thereof, the insulating tape was protruded onto the positive-electrode active-material layer by 2 mm.

In this example, an insulating tape which included a substrate material layer containing 100% of a polyimide and having a thickness of 25 μm and an adhesive layer having a thickness of 7 μm was used. As the polyimide, a non-thermoplastic polyimide having a skeleton represented by the following formula (1) was used. The polyimide having the following structure may be formed, for example, by a reaction between pyromellitic anhydride and diaminodiphenyl ether.

[Chem. 1]

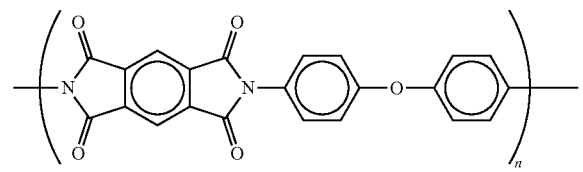

(1)

As the adhesive layer, a mixture which included 75 parts by mass of an acryl-based adhesive agent primarily formed from an acrylic resin and 25 parts by mass of alumina particles (average particle diameter: 0.7 μm) functioning as an insulating inorganic material was used. When the electric resistance of the adhesive layer at 500° C. was measured by the method described above, it was approximately 10 kΩ/mm².

(2) Formation of Negative Electrode

First, 100 parts by mass of flake-shaped man-made graphite having an average particle diameter of approximately 20 μm which functioned as a negative electrode active material, 1 part by mass of a styrene-butadiene rubber (SBR) (binding agent), 1 part by mass of a carboxymethyl cellulose (thickening agent), and water were mixed together, so that a negative-electrode paste was prepared. The negative-electrode paste thus obtained was uniformly applied onto two surfaces of copper foil having a thickness of 8 μm to be used as a negative-electrode current collector, followed by drying and rolling, so that a belt-shaped negative electrode having a width of 59 mm was formed. However, at an end portion of each of two surfaces of the negative electrode which was located at the end of the winding, an exposed section in which the negative-electrode current collector was exposed from one end portion to the other end portion thereof in a width direction was provided.

Next, after a strip-shaped nickel-made negative-electrode lead having a width of 3 mm and a length of 40 mm was overlapped on the exposed section of the negative-electrode current collector and was aligned as was the case of the positive electrode, the overlapping section was welded to the exposed section.

(3) Formation of Electrode Group

The positive electrode and the negative electrode were laminated to each other with at least one separator interposed therebetween and were then wound, so that an electrode group was formed. In this step, as shown in FIG. 4, an extended section of the positive-electrode lead and an extended section of the negative-electrode lead were projected from one end surface and the other end surface of the electrode group, respectively.

(4) Preparation of Nonaqueous Electrolyte

In a mixed solvent containing ethylene carbonate, ethyl methyl carbonate, and dimethyl carbonate (volume ratio: 1:1:8), $LiPF_6$ was dissolved to have a concentration of 1.4 mol/L, so that a nonaqueous electrolyte was prepared.

(5) Formation of Battery

In an iron-made battery case (diameter: 18 mm, height: 65 mm) having an inside surface plated with nickel, the electrode group sandwiched with a lower insulating ring and an upper insulating ring was received. In this step, the negative-electrode lead was provided between the lower insulating ring and a bottom portion of the battery case. In addition, the positive-electrode lead was allowed to pass through a through-hole provided at the center of the upper insulating ring. Next, an electrode bar was allowed to pass through a hollow portion at the center of the electrode group and a through-hole provided at the center of the lower insulating ring, so that one end portion of the negative-electrode lead was welded to an inside bottom surface of the battery case. In addition, one end portion of the positive-electrode lead extended from the through-hole of the upper insulating ring was welded to an inside surface of a sealing plate provided with a gasket at a circumferential portion thereof. Subsequently, after a groove was formed in the vicinity of an opening of the battery case, the nonaqueous electrolyte was supplied in the battery case so as to be impregnated into the electrode group. Next, the opening of the battery case was sealed by the sealing plate, and an opening end portion of the battery case was squeezed with pressure to the circumferential portion of the sealing plate with the gasket interposed therebetween, so that a cylindrical type secondary battery (energy density: 700 Wh/L) was completed.

Example 2

Except that the adhesive layer of the insulating tape was formed using a mixture containing 50 parts by mass of the acryl-based adhesive agent and 50 parts by mass of the alumina particles, a battery was formed in a manner similar to that of Example 1.

Example 3

Except that the adhesive layer of the insulating tape was formed using a mixture containing 30 parts by mass of the acryl-based adhesive agent and 70 parts by mass of the alumina particles, a battery was formed in a manner similar to that of Example 1.

Example 4

Except that the adhesive agent of the insulating tape was changed from the acryl-based adhesive agent to a rubber-based adhesive agent primarily formed from a butyl rubber, a battery was formed in a manner similar to that of Example 1.

Example 5

Except that the adhesive layer of the insulating tape was formed using a mixture containing 50 parts by mass of the rubber-based adhesive agent and 50 parts by mass of the alumina particles, a battery was formed in a manner similar to that of Example 4.

Example 6

Except that the adhesive layer of the insulating tape was formed using a mixture containing 30 parts by mass of the rubber-based adhesive agent and 70 parts by mass of the alumina particles, a battery was formed in a manner similar to that of Example 4.

Comparative Example 1

Except that the alumina particles were not used, and the adhesive layer of the insulating tape was formed only from the acryl-based adhesive agent, a battery was formed in a manner similar to that of Example 1.

Comparative Example 2

Except that the thickness of the adhesive layer was changed to 15 µm, a battery was formed in a manner similar to that of Comparative Example 1.

Comparative Example 3

Except that the alumina particles were not used, and the adhesive layer of the insulating tape was formed only from the rubber-based adhesive agent, a battery was formed in a manner similar to that of Example 4.

Comparative Example 4

Except that the thickness of the adhesive layer was changed to 15 µm, a battery was formed in a manner similar to that of Comparative Example 3.

Comparative Example 5

Except that the substrate material layer of the insulating tape was changed to a substrate material layer formed from 100% of a polypropylene having a thickness of 30 µm, a battery was formed in a manner similar to that of Comparative Example 1.

Comparative Example 6

Except that the substrate material layer of the insulating tape was changed to a substrate material layer formed from 100% of a polypropylene having a thickness of 30 µm, a battery was formed in a manner similar to that of Comparative Example 3.

The structures of the insulating tapes are collectively shown in Table 1.

TABLE 1

| | SUBSTRATE MATERIAL LAYER | | ADHESIVE LAYER | |
|---|---|---|---|---|
| | MATERIAL | THICKNESS (μm) | MASS RATIO BETWEEN MATERIALS | THICKNESS (μm) |
| EXAMPLE 1 | POLYIMIDE | 25 | ALUMINA/ACRYL BASE = 25/75 | 7 |
| EXAMPLE 2 | POLYIMIDE | 25 | ALUMINA/ACRYL BASE = 50/50 | 7 |
| EXAMPLE 3 | POLYIMIDE | 25 | ALUMINA/ACRYL BASE = 70/30 | 7 |
| EXAMPLE 4 | POLYIMIDE | 25 | ALUMINA/RUBBER BASE = 25/75 | 7 |
| EXAMPLE 5 | POLYIMIDE | 25 | ALUMINA/RUBBER BASE = 50/50 | 7 |
| EXAMPLE 6 | POLYIMIDE | 25 | ALUMINA/RUBBER BASE = 70/30 | 7 |
| COMPARATIVE EXAMPLE 1 | POLYIMIDE | 25 | ALUMINA/ACRYL BASE = 0/100 | 7 |
| COMPARATIVE EXAMPLE 2 | POLYIMIDE | 25 | ALUMINA/ACRYL BASE = 0/100 | 15 |
| COMPARATIVE EXAMPLE 3 | POLYIMIDE | 25 | ALUMINA/RUBBER BASE = 0/100 | 7 |
| COMPARATIVE EXAMPLE 4 | POLYIMIDE | 25 | ALUMINA/RUBBER BASE = 0/100 | 15 |
| COMPARATIVE EXAMPLE 5 | POLYPROPYLENE | 30 | ALUMINA/ACRYL BASE = 0/100 | 7 |
| COMPARATIVE EXAMPLE 6 | POLYPROPYLENE | 30 | ALUMINA/RUBBER BASE = 0/100 | 7 |

[Evaluation]

In accordance with JIS C 8714, a forced internal short circuit test of the battery was performed. However, in this evaluation, two types of tests, that is, a standard test using a nickel sample piece having a standard size and a severe test using a nickel sample piece having a larger size, were performed. The nickel sample piece was disposed between the insulating tape and the separator so as to penetrate the insulating tape. In this case, an increase in temperature at a side surface of the battery was measured using a thermo couple. The test results are shown in Table 2.

(Sample Piece of Standard Test)

Height: 0.2 mm, Width: 0.1 mm, L shape having a side length of 1 mm (angle: 90°)

(Sample Piece of Severe Test)

Height: 0.5 mm, Width: 0.2 mm, L shape having a side length of 3 mm (angle: 90°)

TABLE 2

| | INCREASE IN TEMPERATURE (° C.) | |
|---|---|---|
| | STANDARD TEST | SEVERE TEST |
| EXAMPLE 1 | 10 | 30 |
| EXAMPLE 2 | 7 | 10 |
| EXAMPLE 3 | 6 | NO INCREASE IN TEMPERATURE |
| EXAMPLE 4 | 13 | 35 |
| EXAMPLE 5 | 7 | 10 |
| EXAMPLE 6 | 7 | NO INCREASE IN TEMPERATURE |
| COMPARATIVE EXAMPLE 1 | 22 | >100 |
| COMPARATIVE EXAMPLE 2 | 17 | >100 |
| COMPARATIVE EXAMPLE 3 | 27 | >100 |
| COMPARATIVE EXAMPLE 4 | 22 | >100 |
| COMPARATIVE EXAMPLE 5 | 33 | >100 |
| COMPARATIVE EXAMPLE 6 | 36 | >100 |

As apparent from Tables 1 and 2, even when the insulating tapes of Comparative Examples 1 to 6 were used, by the standard test, preferable results were always obtained, and as long as the degree of internal short circuit was at a level which was expected in the past, it was shown that even by the insulating tapes of Comparative Examples 1 to 6, sufficient safety could be obtained. On the other hand, as shown by the results of the severe test, when an internal short circuit which has not been expected in the past occurs, by the difference of the insulating tape, the safety is significantly changed. Furthermore, in the examples, although the thickness of the insulating tape was smaller than that of Comparative Example 2, sufficient safety could be secured. From the results described above, it can be understood that the use of an adhesive layer having an electric resistance of 1 kΩ/mm² or more at 500° C. is significantly advantageous in order to increase the energy density of the battery.

INDUSTRIAL APPLICABILITY

According to a secondary battery of the present invention, even when an internal short circuit is generated by an unexpectedly large foreign material, heat generation and thermal runaway can be effectively suppressed, and as a result, high safety can be obtained. Accordingly, the secondary battery of the present invention may be preferably used as a drive source of an electronic device, such as a notebook personal computer or a mobile phone, an electric power storage apparatus required to have a high output, or a power source of an electric car, a hybrid car, or an electric tool.

REFERENCE SIGNS LIST 10 positive electrode
11 positive-electrode current collector
11a exposed section of positive-electrode current collector
12 positive-electrode active-material layer
13 positive-electrode lead
13a overlapping section
13b extended section
14 insulating tape
14a substrate material layer
14b adhesive layer
15 positive-electrode terminal
20 negative electrode
23 negative-electrode lead
30 separator
60 lower insulating plate
70 battery case
80 upper insulating plate
90 sealing plate
100 lithium ion secondary battery

The invention claimed is:

1. A secondary battery comprising:
a positive electrode having a positive-electrode current collector and a positive-electrode active-material layer disposed on the positive-electrode current collector;
a negative electrode having a negative-electrode current collector and a negative-electrode active-material layer disposed on the negative-electrode current collector;
an electrolyte; and
an insulating tape covering a portion of the positive electrode,
wherein the positive-electrode current collector has an exposed section that the positive-electrode active-material layer is not disposed,
at least a portion of the exposed section is covered with the insulating tape,
the insulating tape has a substrate material layer and an adhesive layer,
the adhesive layer includes an adhesive agent and an insulating inorganic material, wherein the insulating inorganic material is mixed together with the adhesive agent in the adhesive layer,
wherein the substrate material layer has at least one of the group consisting of a polyimide, a polyamide and a poly(amide imide),
wherein the thickness of the insulating tape is 25 μm or more and 35 μm or less,
wherein the insulating inorganic material contains a metal compound having an average particle diameter of 50 nm or more and 1 μm or less, and
wherein the insulating inorganic material contains at least one of a metal nitride or a metal carbide.

2. The secondary battery according to claim 1, wherein the content of the insulating inorganic material included in the adhesive layer is 3 to 80 percent by mass.

3. The secondary battery according to claim 1, wherein the insulating inorganic material includes the metal compound in the form of particles or fibers.

4. The secondary battery according to claim 1, wherein the polyimide contains at least one of a wholly aromatic polyimide, a semi-aromatic polyimide, a thermosetting polyimide, a polypyromellitimide, a poly(ether imide), or a thermosetting polyimide formed by a reaction between a bismaleimide and an aromatic diamine.

5. The secondary battery according to claim 1, wherein the adhesive layer has an electric resistance of 1 kΩ/mm² or more at 500° C.

6. The secondary battery according to claim 1, wherein a thickness $T_{ad}$ of the adhesive layer is 5 to 25 μm.

7. The secondary battery according to claim 1, wherein a thickness $T_{sb}$ of the substrate material layer is 10 to 30 μm.

8. The secondary battery according to claim 1, wherein a ratio $T_{ad}/T_{sb}$ of a thickness $T_{ad}$ of the adhesive layer to a thickness $T_{sb}$ of the substrate material layer is 0.2 to 1.

9. The secondary battery according to claim 1, wherein the insulating tape has a layer containing an insulating filler between the substrate material layer and the adhesive layer.

10. The secondary battery according to claim 3, wherein a shape of the metal compound in the form of particle is a spherical shape, a flake shape, or a whisker shape.

11. The secondary battery according to claim 1, wherein the insulating inorganic material is formed by the metal compound that accounts for 90 percent by mass or more of the insulating inorganic material and a material other than the metal compound.

12. The secondary battery according to claim 1, wherein the insulating inorganic material further contains a metal oxide.

13. The secondary battery according to claim 1, wherein the substrate material layer is formed from a polymer alloy between a polyimide and a resin other than the polyimide.

14. The secondary battery according to claim 1, wherein the substrate material layer has a multilayer structure including a polyimide layer and a second resin layer containing a resin other than the polyimide.

15. The secondary battery according to claim 1, wherein the substrate material layer contains a polyimide, and the content of the polyimide to be contained in the substrate material layer is 80 percent by mass or more.

16. The secondary battery according to claim 1, wherein the adhesive layer includes at least one of an acrylic resin, a natural rubber, a synthetic rubber, a silicone, an epoxy resin, a melamine resin, or a phenol resin.

17. The secondary battery according to claim 1, wherein the adhesive layer includes at least one of a tackifier, a cross-linking agent, an anti-aging agent, a coloring agent, an antioxidant, a chain transfer agent, a plasticizer, a softening agent, a surfactant, or an antistatic agent.

18. The secondary battery according to claim 1, wherein
a positive-electrode lead is electrically connected to the exposed section,
the positive-electrode lead has an extended section projected from the exposed section and an overlapping section overlapping the exposed section,
the insulating tape covers at least a portion of the overlapping section, and
wherein at an approximately central portion of a surface of the positive electrode in a longitudinal direction thereof, a slit-shaped exposed section is provided between opposite end portions of the positive-electrode current collector in a width direction thereof and the insulating tape protrudes from each of the opposite end portions.

19. The secondary battery according to claim 18, wherein the insulating tape protrudes onto a surface of the positive-electrode active-material layer from two end portions of the exposed section in a direction perpendicular to the width direction of the positive-electrode current collector.

* * * * *